(12) United States Patent
Coon (10) Patent No.: US 6,995,954 B1
(45) Date of Patent: Feb. 7, 2006

(54) ESD PROTECTED SUSPENSION INTERCONNECT

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 286 days.

(21) Appl. No.: 10/194,643

(22) Filed: Jul. 11, 2002

Related U.S. Application Data (60) Provisional application No. 60/305,454, filed on Jul. 13, 2001, provisional application No. 60/357,536, filed on Feb. 15, 2002.

(51) Int. Cl.
G11B 21/21 (2006.01)

(52) U.S. Cl. .................. 360/245.9; 360/244.3

(58) Field of Classification Search ............. 360/245.9, 360/246, 264.2, 266.3, 323, 244.3
See application file for complete search history.

(56) References Cited

U.S. PATENT DOCUMENTS

| | | | |
|---|---|---|---|
| 3,562,037 A | 2/1971 | Travis | |
| 4,231,154 A | 11/1980 | Gazdik et al. | |
| 4,383,728 A | 5/1983 | Litington | |
| 4,400,410 A | 8/1983 | Green et al. | |
| 4,480,288 A | 10/1984 | Gazdik et al. | |
| 4,504,410 A | 3/1985 | Hempel et al. | |
| 4,576,964 A | 3/1986 | Eggler et al. | |
| 4,698,256 A | 10/1987 | Giglia et al. | |
| 4,746,538 A | 5/1988 | Mackowski | |
| 4,809,876 A | 3/1989 | Tomaswick et al. | |
| 4,914,551 A | 4/1990 | Anschel et al. | |
| 5,091,229 A * | 2/1992 | Golike et al. ............. 428/35.2 | |
| 5,227,008 A | 7/1993 | Klun et al. | |
| 5,401,913 A | 3/1995 | Gerber et al. | |
| 5,465,186 A | 11/1995 | Bajorek et al. | |
| 5,478,616 A | 12/1995 | Kochem et al. | |
| 5,508,071 A | 4/1996 | Banholzer et al. | |
| 5,508,092 A | 4/1996 | Kimock et al. | |
| 5,559,367 A | 9/1996 | Cohen et al. | |
| 5,643,343 A | 7/1997 | Selifanov et al. | |
| 5,680,274 A * | 10/1997 | Palmer .................... 360/245.9 |
| 5,707,409 A | 1/1998 | Martin et al. | |
| 5,710,682 A | 1/1998 | Arya et al. | |
| 5,761,009 A | 6/1998 | Hughbanks et al. | |
| 5,792,558 A | 8/1998 | Jonas et al. | |
| 5,796,570 A * | 8/1998 | Mekdhanasarn et al. .... 361/126 |
| 6,015,509 A * | 1/2000 | Angelopoulos et al. ..... 252/500 |
| 6,046,886 A | 4/2000 | Himes et al. | |
| 6,099,757 A | 8/2000 | Kulkarni | |
| 6,125,015 A | 9/2000 | Carlson et al. | |
| 6,146,813 A | 11/2000 | Girard et al. | |
| 6,316,734 B1 | 11/2001 | Yang | |
| 6,459,043 B1 * | 10/2002 | Dodsworth ................. 174/254 |
| 6,576,148 B1 * | 6/2003 | Shum et al. ................... 216/13 |
| 6,631,052 B1 * | 10/2003 | Girard et al. ............ 360/245.8 |
| 6,680,824 B2 * | 1/2004 | Kamigama et al. ...... 360/265.9 |
| 6,704,165 B2 * | 3/2004 | Kube et al. .............. 360/245.9 |
| 6,801,402 B1 * | 10/2004 | Subrahmanyam et al. ....................... 360/245.9 |
| 2003/0062194 A1 | 4/2003 | Dodsworth et al. | |

FOREIGN PATENT DOCUMENTS

EP      0 615 257 A2      9/1994

(Continued)

*Primary Examiner*—William J Klimowicz
(74) *Attorney, Agent, or Firm*—Louis J. Bachand (57) ABSTRACT

ESD is prevented in a disk drive suspension electrical interconnect having plural pairs of conductive traces supported by an insulative film by disposing a material having a lower resistivity than the insulative film but not so low that the conductive traces are shunted. The material is disposed in or on the film and is to be connected to ground.

79 Claims, 3 Drawing Sheets

FOREIGN PATENT DOCUMENTS

| | | |
|---|---|---|
| EP | 0 717 418 A2 | 6/1996 |
| EP | 1 718 715 A2 | 2/2002 |
| JP | 02273314 A * | 11/1990 |
| JP | 08249849 A * | 9/1996 |
| JP | 11250434 A * | 9/1999 |
| JP | 2000011337 A * | 1/2000 |

* cited by examiner

ESD PROTECTED SUSPENSION INTERCONNECT

RELATED APPLICATION

This application claims the benefit of U.S. Provisional Application Ser. No. 60/305,454, filed Jul. 13, 2001, and U.S. Provisional Application Ser. No. 60/357,536, filed Feb. 15, 2002.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and, more particularly, to improvements in the design and manufacture of disk drive suspensions and suspension interconnects for disk drive suspensions comprising conductive traces supported on an insulative film with or without an attached metal layer, so as to reduce or eliminate the potential for electrostatic discharge (ESD) from said suspensions and from interconnects to recording heads.

The invention achieves ESD reduction or elimination by disposing within, at or on surfaces where the accumulation of static charge is likely to occur, such as the slider side of a suspension and the insulative film in a suspension interconnect, an ESD potential modifying agent comprising a material having a resistivity such that accumulating charges will be leaked off the suspension or interconnect to ground. In the case of a suspension interconnect, which term refers to an assembly of conductive traces and insulative film and optionally a support layer usually of metal that may be an added layer of the interconnect or that may define a rigid portion of a suspension, the added coating or impregnation of conductive material will have a resistivity lower than the insulative film layer resistivity. The resistivity is, however, high enough that the adjacent conductive traces are not shunted when the coating or impregnating material is on and/or in the insulative film layer in the area adjacent the conductive traces. In general, the disposed coating or impregnating material is adequately conductive to leak charge from the film layer to ground, e.g. to the grounded metal layer of the interconnect, if any, or other grounded structure, at a rate greater than the rate of accumulation of charge occurring so that there is not a build-up of charge, but rather a continual leaking of charge while avoiding shunting the traces to ground.

2. Description of the Related Art

Typical expedients for preventing ESD have involved a temporary conductor selectively shunting the conductive traces, e.g. during suspension attachment to the recording head and during head stack assembly operations. The added step of attachment of separate shunts is not always feasible or convenient.

BRIEF SUMMARY OF THE INVENTION

It is an object of the invention to provide a continuing electrostatic potential discharge for a disk drive suspension and for a suspension interconnect against electrostatic discharge damage, particularly against recording head-damaging ESD build-up. It is a further object have an modifying agent distributed at the suspension assembly surface, that is at, within or atop the surface, as by incorporation into the plastic film component of the suspension at a depth that enables the modifying agent to affect the resistivity of the surface, or coating the metal or plastic component at exposed surfaces, and particularly the exposed surfaces on the slider side of the suspension. It is a further object to fill, impregnate or coat the insulative film layer in an electrical interconnect laminate of trace conductors, insulative film and an optional metal, e.g. stainless steel or copper metal layer, with a resistivity modifying agent such as a composition or material having a resistivity less than the surface resistivity of the film, and greater than the surface resistivity of the metal layer, and not so great that the trace conductors are shunted thereby. Preferably the resistance of the material or the material and film support is one-million times greater than the resistivity of conductive copper traces.

These and other objects of the invention to become apparent hereinafter are realized in a disk drive suspension assembly comprising a signal conductor and a spring element for biasing a slider into operating proximity with a disk, the assembly having a surface tending to develop an electrostatic discharge potential, and a surface resistivity modifying agent at the assembly surface, the agent being present at the assembly surface in an electrostatic discharge potential lowering effective amount.

In this and like embodiments, typically, the modifying agent provides the assembly surface a surface resistivity between about 100,000 ohms per square and 1000 megohms per square, the modifying agent comprises a metal oxide that can be coated on or incorporated into the assembly surface, the metal oxide comprising preferably chromium oxide, tin oxide, nickel oxide, lead oxide or copper oxide.

In other embodiments, typically, the modifying agent comprises a metal in an electrostatic potential dissipating amount at the surface, e.g. one or more of the metal listed in the TABLE hereinafter, and particularly one or more of aluminum, gold, chromium and tin. As with the metal oxide above the metal modifying agent can be coated on or incorporated into the assembly surface.

In more particularly preferred embodiments, typically, the modifying agent comprises a surface coating formed in situ, as by being vapor deposited, sputter-deposited, and using carbon particularly in the form of carbon black, carbon fibers or a colloidal suspension of graphite.

In these and like embodiments, typically, the modifying agent can comprise an organic composition, such as a surfactant or conductive synthetic organic polymer. Thus, the invention disk drive suspension assembly can comprise a plurality of conductive traces supported on a plastic film, the plastic film defining the surface and comprising the synthetic organic polymer.

In a further embodiment, the invention provides a disk drive suspension comprising a conductor and a flexure for supporting on the suspension a slider in operating proximity to a disk, the suspension having a surface tending to develop an electrostatic discharge potential, and a surface resistivity modifying agent at the suspension surface in electrostatic discharge potential lowering amount.

In this and like embodiments, typically, the surface resistivity modifying agent comprises an electrostatic potential dissipative composition distributed at the suspension surface in an amount providing the surface with a surface resistivity between about 100,000 ohms per square and 1000 megohms per square, the suspension has a side facing the slider and a side facing away from the slider, the composition being found only on the side facing the slider, and the composition comprises a metal oxide, such as listed above distributed in or on the surface, a metal, such as listed above, carbon as listed above distributed in or on the surface, and an organic material, such as listed above, distributed in or on the surface, e.g., the composition comprises a film-forming organic material.

In a further embodiment, the invention provides a disk drive suspension electrical interconnect comprising a plastic layer, a plurality of conductive traces on a first side of the plastic layer and a metal member on a second side of the plastic layer, and a resistivity modifying agent distributed in or on the first side of the plastic layer.

In a further embodiment, the invention provides a suspension electrical interconnect comprising plural pairs of conductive traces and an insulative film layer supporting the traces, the film layer having a resistivity tending to build an electrostatic potential on the film layer, and an electrostatic discharge dissipative material disposed on or in the insulative film layer, the material having a lower resistivity than the film layer but higher than will allow shunting of the conductive traces, the material being adapted to be electrically coupled to ground.

In these and like embodiments, including the next embodiment, typically, the suspension interconnect traces have a volume resistivity of about $4\times10^{-6}$ ohm-cm, the insulative film has a volume resistivity of between about $1\times10^{11}$ and $1\times10^{18}$ ohm-cm, and the material or the insulative film incorporating the material has a volume resistivity of between about $1\times10^{3}$ and about $1\times10^{7}$ ohm-cm, the material is disposed on and/or within the film layer, and comprises the metals, metal oxides, carbon, such as carbon black, carbon fiber or aqueous dispersed graphite, and organic materials and compositions noted above, In a further embodiment, the invention provides a suspension electrical interconnect comprising a plural pairs of conductive traces, an insulative film layer supporting the traces and supported or supportable by a metal member, the film layer having a resistivity tending to build an electrostatic potential on the film layer, and an electrostatic discharge preventative material, as above-disclosed, disposed on or in the insulative film layer, the material having a lower resistivity than the film layer but higher than will allow shunting of the conductive traces, the material being adapted to be electrically coupled to ground.

In its method aspects the invention contemplates a method of reducing electrostatic discharge potential in a disk drive suspension comprising one or more portions tending to build up an electrostatic potential, including exposing at least one surface of a the portion, and treating the exposed portion surface with a resistivity modifying agent comprising an electrostatic charge dissipative composition. Typically, the method includes selecting as the composition a composition having a surface resistivity between about 100,000 ohms per square and 1000 megohms per square, e.g. a composition comprising metal oxides, metals, carbon, or organic compositions.

In a further method embodiment, the invention provides a method of preventing electrostatic discharge in a suspension electrical interconnect comprising an insulative film with high resistivity and plural pairs of trace conductors, including disposing a material having a lower resistivity on or in the insulative film, and grounding the material, wherein, typically, the traces are copper and have a volume resistivity of about $4\times10^{-6}$ ohm-cm, the insulative film has a volume resistivity of between about $1\times10^{11}$ and $1\times10^{18}$ ohm-cm, and the material or the insulative film incorporating the material has a volume resistivity of between about $1\times10^{3}$ and about $1\times10^{7}$ ohm-cm.

In a still further method embodiment, the invention provides a method of reducing electrostatic discharge potential on a disk drive suspension comprising a base portion, a spring portion and a rigid portion adapted to carry a slider, one or more of the portions having a surface tending to build up an electrostatic discharge potential, including exposing the surface, and treating the exposed surface with an electrostatic discharge dissipative material, wherein typically one selects as the electrostatic dissipative material a material having a surface resistivity between about 100,000 ohms per square and 1000 ohms per square and comprising one or more of metals, metal oxides, carbon, and organic compositions.

BRIEF DESCRIPTION OF THE SEVERAL VIEWS OF THE DRAWINGS

The invention will be further described in conjunction with the attached drawings in which.

DETAILED DESCRIPTION

The invention provides a surface resistivity modified suspension or suspension interconnect that is coated, doctored, impregnated, blended, combined, or doped with a surface resistivity modifying agent, typically at the insulative film or metal layer surface, wherein the surface modified member is used in replacement of the conventional metal layer or insulative film. Thus, in accordance with the invention, the insulative film layer of a suspension interconnect, typically a polyimide film, but any suitable synthetic organic polymeric layer, as used in wireless suspensions and sometimes referred to as a flexible circuit is treated to be resistant to build up of electrostatic potentials that may discharge causing damage to the heads. The modifying treatment such as doping can be internal as a filler or as an impregnant, or external, as a coating provided the surface resistivity modifying agent material is sufficiently conductive and sufficiently concentrated to act as if continuous (although not necessarily strictly continuous since current can flow between non-contiguous components of the agent material) to ground ESD-inducing build-ups of charge.

Figure 1:
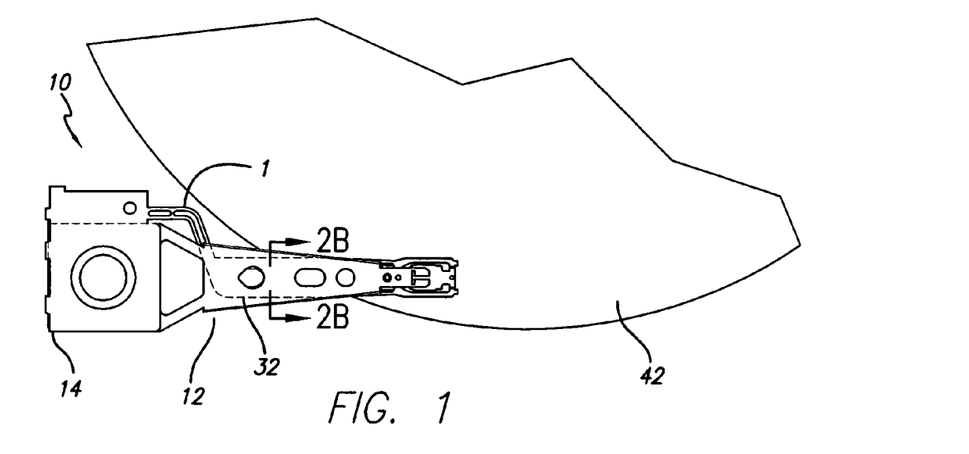
FIG. 1 is a top plan view of a disk drive suspension according to the invention having an interconnect assembly of conductive traces and an insulative film layer, that may include an optional stainless steel layer, and that interconnects, typically, a slider having a recording head and the suspension electronics either alone or as part of a larger assembly.
Figure 2A:
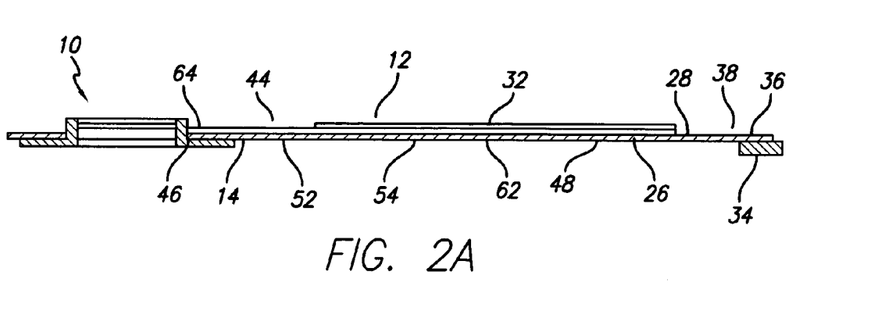
FIG. 2A is a side elevation view thereof.
Figure 2B:
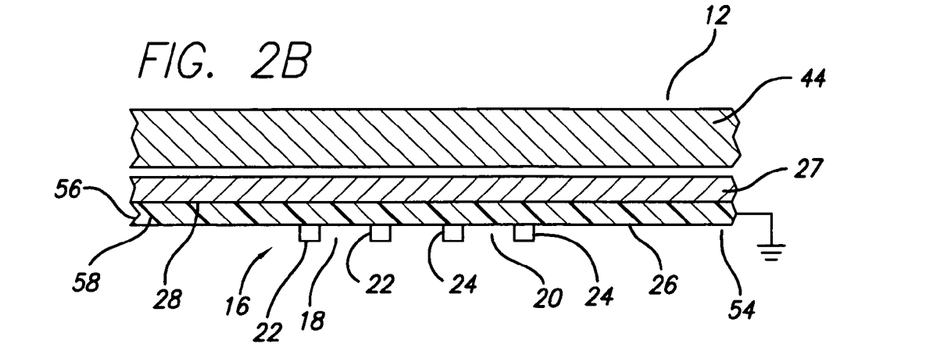
FIG. 2B is a view taken on line 2B–2B in FIG. 1

With reference now to the drawings in detail, in FIGS. 1, 2A and 2B there is shown a disk drive suspension assembly 10 comprising an interconnect 12 for a disk drive suspension 14. Interconnect 12 comprises a conductor 16 in the form of plural pairs 18, 20 of conductive traces 22, 24 disposed on an insulative plastic layer 26 supported on a metal layer 27, such as a stainless steel layer, or a copper metal layer.

Suspension assembly 10 further includes in this embodiment a spring element 32 for biasing slider 34 carried by flexure 36 at the distal end 38 of the suspension assembly into operating proximity with the disk 42. The disk drive suspension assembly 10 as shown comprises the conductor 16 and the spring element 32. Spring element 32 is typically a load beam 44 that carries the conductor 16 and will typically have a base portion 46 that connects to an actuator (not shown), a rigid portion 48, and a spring portion 52 that biases the rigid portion toward the disk 42. Rigid portion 48 carries flexure 36, and the flexure supports slider 34 in operating proximity to the disk 42.

The electrical interconnect 12 comprising the conductor 16 and its conductive traces 22, 24 supported on insulative film or plastic layer 26 defines the suspension surface 28 that tends to develop an electrostatic discharge potential. In accordance with the invention, a surface resistivity modifying agent 54 is provided at the suspension surface 28 in an electrostatic discharge potential lowering amount. For purposes of blocking undue build-up of electrostatic discharge potential on surface 28 and any other suspension surfaces where ESD is or may be a problem, the invention provides in the suspension assembly 10 the surface resistivity modifying agent 54 at the surface 28, and like-affected surfaces, as desired.

In FIG. 2B modifying agent 54 is shown to comprise a layer 56 of the agent embedded in a binder 58 and adhered to the surface 28. The layer 56 can be laid down as a preformed layer or be formed in situ, e.g. by putting down a fluid binder and adding and distributing a fluid or particulate form of the modifying agent 54 through the binder. Or, the deposit of modifying agent 54 can be self-adhering as in the case of the liquids identified hereinbelow, or, where particulate, the modifying agent can be on or embedded in the surface 28 through impact, softening of the surface, or through various pretreatments that prepare the surface to receive and retain the modifying agent.

In these cases, the modifying agent 54 is present at the surface 28 in an electrostatic discharge potential lowering effective amount, e.g. the agent provides the surface 28 a surface resistivity between about 100,000 ohms per square and 1000 megohms per square.

As noted hereinabove, the modifying agent 54 can comprise a metal oxide, see the TABLE below, that can be coated on or incorporated into the assembly surface 28, the metal oxide comprising preferably chromium oxide, tin oxide, nickel oxide, lead oxide and/or copper oxide.

Alternatively, the modifying agent 54 comprises a metal in an electrostatic potential dissipating amount at the surface 28, e.g. one or more of the metals listed in the TABLE following, and particularly one or more of aluminum, gold, chromium and tin. As with the metal oxides above the metal modifying agent 54 can be coated on or incorporated into the assembly surface 28, as by being coated, vapor deposited or sputter-deposited, as is deemed effective. Carbon, particularly in the form of carbon fibers or a colloidal suspension of graphite, is useful as the modifying agent 54 on or in the surface 28.

In further embodiments, the modifying agent 54 can comprise an organic composition, such as a surfactant or conductive synthetic organic polymer, e.g. as listed in the TABLE. See the discussion of FIGS. 3, 5 and 7 below.

In a further embodiment, the plastic layer film surface 28 is modified to include and further comprise a modifying agent 54 that is not an oxide or metal particulate but a synthetic organic polymer or other like organic composition listed in the TABLE.

Among specific materials useful in the invention are:

TABLE

| Oxides/<br>Carbon/Glass | Metals/Alloys | Organic Compositions |
|---|---|---|
| Chrome Oxide | Silver | Surfactants, such as |
| Tin Oxide | Barium | Polyalkoxy Ethers, Esters |
| Nickel Oxide | Beryllium | and Glycols; |
| Lead Oxide | Bismuth | |
| Copper Oxide | Cadmium | Inherently Conductive or |
| Carbon such as | Mercury | Dissipative Polymers, |
| carbon black, | Indium | such as Polyanilines, |
| carbon fiber or | Iridium | Polypyrroles, |
| colloidal graphite | Gold | Polythiophenes, |
| suspension | Chromium | Polyalkoxyethers, such |
| Glass particles or | Nickel | as Polyethylene Oxide |
| fibers impregnated | Cobalt | alone and in combination |
| or coated with | Tin | with Polyethylene in |
| conductors such as | Aluminum | minor weight amounts, |
| metals or oxides, | Copper | such as 10 to 30 wt. %, |
| as listed adjacently, | Stainless Steel (an alloy) | or Filled to be |
| to be conductive | Iron | Conductive, such as |
| fillers | Nickel-Chrome (an alloy) | Polyolefins e.g. |
| | Tin-Lead alloy | Polyethylenes, |
| | Platinum | Polypropylenes, and |
| | Combinations of the | Polystyrenes, and |
| | above, e.g. | Fluorinated Polymers, |
| | Tin-Lead-Silver | Polyesters, Polyethers, |
| | Monel (an alloy) | Polyetheretherketones |
| | R-Monel (an alloy) | and copolymers thereof |
| | K-Monel (an alloy) | with their and other |
| | Incoloy (an alloy) | monomers. |
| | Inconel (an alloy) | |
| | 326 Monel (an alloy) | |
| | KR Monel (an alloy) | |
| | Cathaloy (an alloy) | |

Where the spring element 32 has a side 62 that would face the slider 34 and a side 64 that would face away from the slider, the composition of ESD preventative layer 56 can be used on only the side facing the slider, if desired.

All of the modifying agent compositions listed in the TABLE can be used as a layer 56 on the suspension surface 28.

Figure 4:
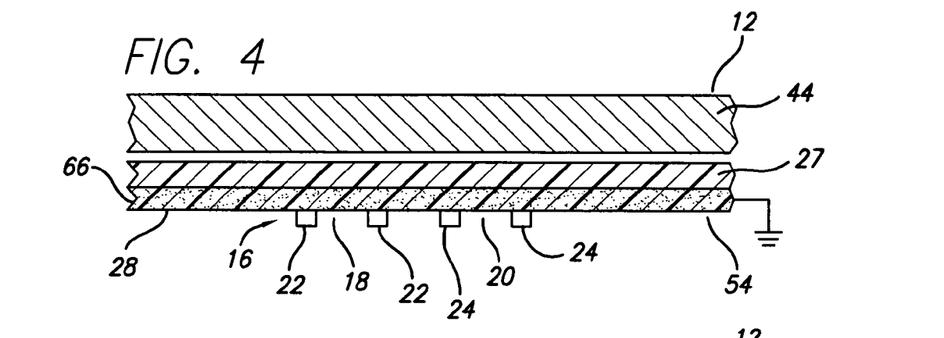
FIG. 4 is a view like FIG. 2B of a further embodiment.

In FIG. 4, the insulative plastic layer 26 is interiorly modified by incorporation of the modifying agent 54 into the layer in its surface margin 66. This embodiment of the invention is particularly apt for modifying agents 54 that are particulate, such as metal oxide, metal, and carbon. Naturally, the concentration and/or location of the modifying agent 54 in the plastic layer 26 should be such as will bring about the desired surface resistivity modification at the surface 28 on which electrostatic discharge potential buildup is to occur.

In FIGS. 1, 2A and 2B and 3, the metal support layer 27 is typically stainless steel and is to be attached to the load beam 44 in a so-called TSA (Trace Suspension Assembly) configuration where the steel layer is laminated to the insulative plastic layer 26, and in this invention acts as a ground layer.

Figure 3:
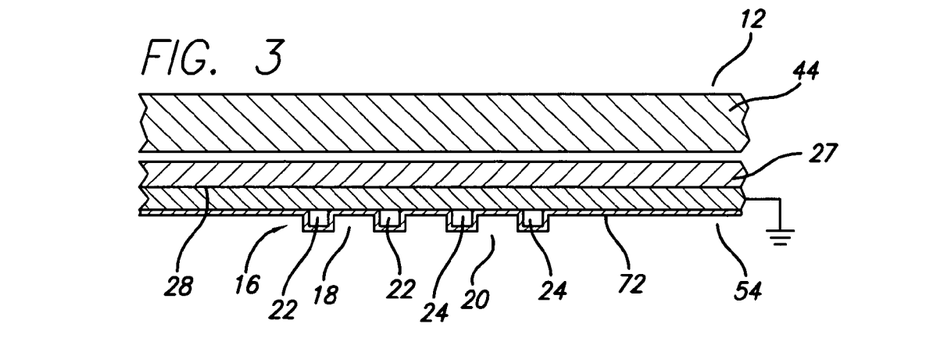
FIG. 3 is a view like FIG. 2B of a further embodiment.
Figure 5:
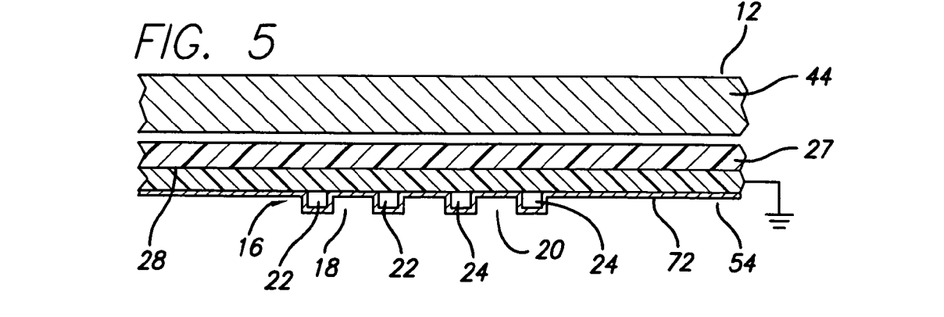
FIG. 5 is a view like FIG. 2B of a further embodiment.

In FIGS. 4 and 5, wherein like parts have like numbers, the metal layer 27 is typically copper in a so-called FSA (Flex Suspension Assembly) configuration wherein the interconnect 12 comprises an upper layer of copper that is made into conductive traces 22, 24, the insulative plastic layer 26, and a lower layer of copper as the metal layer 27 which is conductive (like the stainless steel layer in FIG. 3)

and acts as a ground layer herein. Layer 27 in these embodiments is formed of copper metal, the term copper including alloys of copper.

Figure 6:
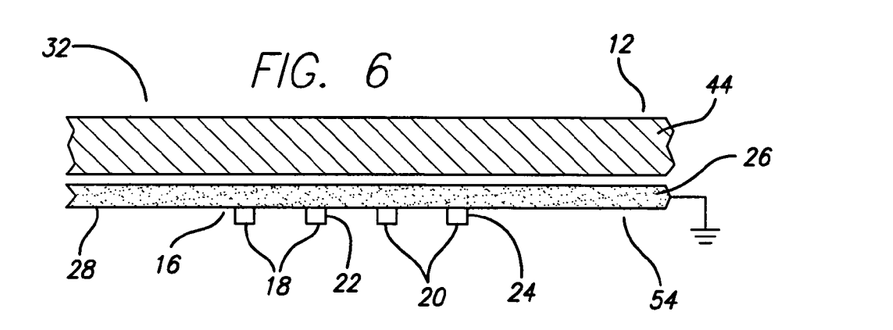
FIG. 6 is a view like FIG. 2B of a further embodiment.
Figure 7:
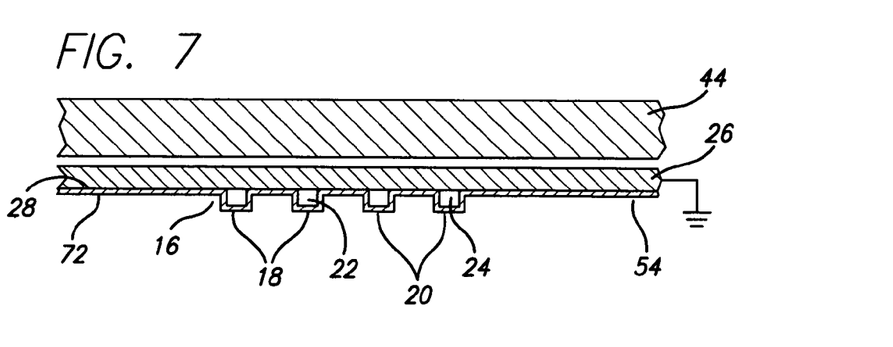
FIG. 7 is a view like FIG. 2B of a further embodiment.

In FIGS. 6 and 7, the support and grounding layer 27 is omitted and the suspension 10 comprises the load beam 44 and the assembly of the insulative plastic layer 26 and the conductive traces 22, 24.

In FIGS. 3, 5 and 7, the modifying agent 54 is in the form of a coating 72, suitably selected from those compositions and materials in the TABLE that are film forming in their own right such as synthetic polymers, or those materials that can be deposited as films and coatings through combinations with other TABLE materials or other film-forming materials. The coating 72 is laid down as any coating material, in a thickness as need to provide the charge dissipative function discussed herein.

Typically, the suspension interconnect conductive 22, 24 have a volume resistivity of about $4 \times 10^{-6}$ ohm-cm, the insulative layer 26 has a volume resistivity of between about $1 \times 10^{11}$ and $1 \times 10^{18}$ ohm-cm, and the resistivity modifying composition or material 54, or the insulative layer incorporating the material has a volume resistivity of between about $1 \times 10^3$ and about $1 \times 10^7$ ohm-cm when disposed on and/or within the insulative layer or other part of the suspension where electrostatic discharge can occur, and the material comprises the metals, metal oxides, carbon, such as aqueous dispersed graphite, and organic materials and compositions noted in the TABLE above.

In all embodiments, the charge dissipative material 54 is connected to ground directly or indirectly.

The invention method of reducing electrostatic discharge potential in a disk drive suspension assembly 10 comprising one or more portions tending to build up an electrostatic potential, includes exposing at least one surface 28 of the portion, and treating the exposed portion surface with a resistivity modifying agent 54 comprising an electrostatic charge dissipative composition. Typically, the method includes selecting as the composition a composition having a surface resistivity between about 100,000 ohms per square and 1000 megohms per square, e.g. a composition comprising metal oxides, metals, carbon, or organic compositions.

In a further embodiment, the invention method of preventing electrostatic discharge in a suspension electrical interconnect 12 comprising insulative layer 26 with high resistivity and plural pairs 18, 20 of trace conductors 22, 24, includes disposing a material 54 having a lower resistivity on or in the insulative layer, and grounding the material, wherein, typically, the traces are copper and have a volume resistivity of about $4 \times 10^{-6}$ ohm-cm, the insulative layer is a polyimide and has a volume resistivity of between about $1 \times 10^{11}$ and $1 \times 10^{18}$ ohm-cm, and the material or the insulative layer incorporating the material has a volume resistivity of between about $1 \times 10^3$ and about $1 \times 10^7$ ohm-cm. Preferably the resistance of the material or the material and film support is one-million times greater than the resistivity of the copper traces.

The invention thus provides a continuing electrostatic potential discharge for a disk drive suspension and a suspension interconnect against electrostatic discharge damage to the suspension, particularly against recording head-damaging ESD build-up, by having distributed at the suspension assembly surface, that is within the surface or atop the surface, as by incorporation into the plastic layer component of the suspension, or coating the other metal or plastic components at exposed surfaces, and particularly the exposed surfaces on the slider side of the suspension, to impregnate or coat the insulative film layer in an electrical interconnect laminate of trace conductors, insulative layer and the optional metal, e.g. stainless steel or copper ground layer, with a resistivity modifying agent 54 such as a composition or material having a resistivity less than the surface resistivity of the insulative layer, and greater than the surface resistivity of the metal layer, and not so great that the trace conductors are shunted thereby. The foregoing objects are thus met.

What is claimed is:

1. A disk drive suspension assembly comprising a signal conductor and a spring element for biasing a slider into operating proximity with a disk, said assembly having a surface tending to develop an electrostatic discharge potential, and a surface resistivity modifying agent at said assembly surface, said agent being electrically coupled to ground and present at said assembly surface in an electrostatic discharge potential lowering amount effective for continually leaking charge to ground at a rate greater than the rate of accumulation of electrostatic charge on said assembly surface while avoiding shunting of said conductor, said surface resistivity modifying agent being in contact with said conductor.

2. The disk drive suspension assembly according to claim 1, in which said modifying agent provides said assembly surface a surface resistivity between about 100,000 ohms per square and 1000 megohms per square.

3. The disk drive suspension assembly according to claim 2, in which said modifying agent comprises a metal oxide.

4. The disk drive suspension assembly according to claim 3, in which said metal oxide is coated on said assembly surface.

5. The disk drive suspension assembly according to claim 3, in which said metal oxide is incorporated into said assembly surface.

6. The disk drive suspension assembly according to claim 3, in which said metal oxide comprises chromium oxide, tin oxide, nickel oxide, lead oxide or copper oxide.

7. The disk drive suspension assembly according to claim 2, in which said modifying agent comprises a metal in an electrostatic potential dissipating amount at said surface.

8. The disk drive suspension assembly according to claim 7, in which said modifying agent metal comprises one or more of
Silver
Barium
Beryllium
Bismuth
Cadmium
Mercury
Indium
Iridium
Gold
Chromium
Nickel
Cobalt
Tin
Aluminum
Copper
Stainless Steel alloy
Iron-Nickel-Chrome alloy
Tin-Lead alloy
Platinum
Tin-Lead-Silver
Monel alloy
R-Monel alloy
K-Monel an alloy
Incoloy alloy Inconel alloy
326 Monel alloy
KR Monel alloy, and
Cathaloy alloy.

9. The disk drive suspension assembly according to claim 7, in which said metal comprises one or more of aluminum, gold, chromium and tin.

10. The disk drive suspension assembly according to claim 8, in which said metal is coated on said assembly surface.

11. The disk drive suspension assembly according to claim 8, in which said metal is incorporated into said assembly surface.

12. The disk drive suspension assembly according to claim 2, in which said modifying agent comprises a surface coating formed in situ.

13. The disk drive suspension assembly according to claim 12, in which said coating is vapor deposited.

14. The disk drive suspension assembly according to claim 12, in which said coating is sputter-deposited.

15. The disk drive suspension assembly according to claim 2, in which said modifying agent comprises carbon.

16. The disk drive suspension assembly according to claim 15, in which said carbon comprises carbon black, carbon fiber or a colloidal suspension of graphite.

17. The disk drive suspension assembly according to claim 2, in which said modifying agent comprises an organic composition.

18. The disk drive suspension assembly according to claim 17, in which said organic composition comprises a surfactant.

19. The disk drive suspension assembly according to claim 17, in which said organic composition comprises a synthetic organic polymer.

20. The disk drive suspension assembly according to claim 18, in which said conductor comprises a plurality of conductive traces supported on a plastic film, said plastic film defining said surface and comprising a synthetic organic polymer.

21. A disk drive suspension comprising a signal conductor and a flexure for supporting on said suspension a slider in operating proximity to a disk, said suspension having a surface tending to develop an electrostatic discharge potential, and a surface resistivity modifying agent at said suspension surface electrically coupled to ground and present at said surface in an amount effective for continually leaking charge to ground at a rate greater than the rate of accumulation of electrostatic charge on said assembly surface while avoiding shunting of said conductor said surface resistivity modifying agent being in contact with said conductor.

22. The disk drive suspension according to claim 21, in which said surface resistivity modifying agent comprises an electrostatic potential dissipative composition distributed at said suspension surface in an amount providing said surface with a surface resistivity between about 100,000 ohms per square and 1000 megohms per square.

23. The disk drive suspension according to claim 22, in which said suspension element has a side facing said slider and a side facing away from said slider, said composition being found only on said side facing said slider.

24. The disk drive suspension according to claim 22, in which said composition comprises a metal oxide distributed in or on said surface.

25. The disk drive suspension according to claim 22, in which said composition comprises a metal distributed in or on said surface.

26. The disk drive suspension according to claim 22, in which said composition comprises an organic material distributed in or on said surface.

27. The disk drive suspension according to claim 24, in which said metal oxide comprises chromium oxide, tin oxide, nickel oxide, lead oxide or copper oxide.

28. The disk drive suspension according to claim 25, in which said coating comprises a metal.

29. The disk drive suspension according to claim 28, in which said metal comprises one or more of
Silver
Barium
Beryllium
Bismuth
Cadmium
Mercury
Indium
Iridium
Gold
Chromium
Nickel
Cobalt
Tin
Aluminum
Copper
Stainless Steel alloy
Iron-Nickel-Chrome alloy
Tin-Lead alloy
Platinum
Tin-Lead-Silver
Monel alloy
R-Monel alloy
K-Monel an alloy
Incoloy alloy
Inconel alloy
326 Monel alloy
KR Monel alloy
Cathaloy alloy.

30. The disk drive suspension according to claim 26, in which said composition comprises a surfactant.

31. The disk drive suspension according to claim 26, in which said composition comprises a synthetic organic polymer.

32. The disk drive suspension according to claim 22, in which said composition is incorporated into said surface.

33. The disk drive suspension according to claim 22, in which said composition is coated on said surface.

34. The disk drive suspension according to claim 33, in which said composition comprises one or more of aluminum, gold, chromium and tin.

35. The disk drive suspension according to claim 33, in which said composition is vapor deposited.

36. The disk drive suspension according to claim 33, in which said composition is sputter-deposited.

37. The disk drive suspension according to claim 33, in which said composition comprises carbon.

38. The disk drive suspension according to claim 37, in which said carbon comprises carbon black, carbon fiber or a colloidal suspension of graphite.

39. The disk drive suspension according to claim 33, in which said composition comprises a film-forming organic material.

40. The disk drive suspension according to claim 39, in which said film-forming organic material comprises a surfactant.

41. The disk drive suspension according to claim 33, in which said composition comprises a synthetic organic polymer.

42. A disk drive suspension electrical interconnect comprising a plastic layer, a plurality of conductive traces on a first side of the plastic layers and a metal member on a second side of said plastic layer, and a resistivity modifying agent distributed in or on said first side of said plastic layer and electrically coupled to ground, said agent being present in an amount effective for continually leaking charge to ground at a rate greater than the rate of accumulation of electrostatic charge on said interconnect while avoiding shunting of said conductive traces, said resistivity modifying agent being in contact with said conductive traces.

43. A suspension electrical interconnect comprising plural pairs of conductive traces and an insulative film layer supporting the traces, said film layer having a resistivity tending to build an electrostatic potential on said film layer, and an electrostatic discharge dissipative material disposed on or in said insulative film layer, said material having a lower resistivity than said film layer but higher than will allow shunting of said conductive traces, said material being electrically coupled to ground and present in an amount effective for continually leaking charge to ground at a rate greater than the rate of accumulation of electrostatic charge on said interconnect while avoiding shunting of said traces.

44. The suspension electrical interconnect according to claim 43, in which said traces have a volume resistivity of about $4\times10^{-8}$ ohm-cm, said insulative film has a volume resistivity of between about $1\times10^{11}$ and $1\times10^{18}$ ohm-cm, and said material or said insulative film incorporating said material has a volume resistivity of between about $1\times10^{3}$ and about $1\times10^{7}$ ohm-cm.

45. The electrical interconnect according to claim 43, in which said material is disposed on said film layer.

46. The electrical interconnect according to claim 43, in which said material is disposed within said film layer.

47. The electrical interconnect according to claim 43, in which said material comprises a metal oxide.

48. The electrical interconnect according to claim 43, in which said material comprises metal.

49. The electrical interconnect according to claim 43, in which said material comprises carbon.

50. The electrical interconnect according to claim 49, in which said carbon comprises carbon black, carbon fiber or aqueous dispersed graphite.

51. The electrical interconnect according to claim 43, in which said material comprises a film-forming organic composition.

52. The electrical interconnect according to claim 43, in which said film forming organic composition comprises a surfactant.

53. A suspension electrical interconnect, said interconnect comprising a plural pairs of conductive traces, an insulative film layer supporting the traces and supportable by a metal member, said film layer having a resistivity tending to build an electrostatic potential on said film layer, and an electrostatic discharge preventative material disposed on or in said insulative film layer, said material having a lower resistivity than said film layer but higher than will allow shunting of said conductive traces, said material being electrically coupled to ground and present in an amount effective for continually leaking charge to ground at a rate greater than the rate of accumulation of electrostatic charge on said interconnect while avoiding shunting of said conductive traces.

54. The suspension electrical interconnect according to claim 53, in which said traces have a volume resistivity of about $4\times10^{-6}$ ohm-cm, said insulative film has a volume resistivity of between about $1\times10^{11}$ and $1\times10^{18}$ ohm-cm, and said material or said insulative film incorporating said material has a volume resistivity of between about $1\times10^{3}$ and about $1\times10^{7}$ ohm-cm.

55. The electrical interconnect according to claim 53, in which said material is disposed on said film layer.

56. The electrical interconnect according to claim 53, in which said material is disposed within said film layer.

57. The electrical interconnect according to claim 53, in which said material comprises a metal oxide.

58. The electrical interconnect according to claim 53, in which said material comprises metal.

59. The electrical interconnect according to claim 53, in which said material comprises carbon.

60. The electrical interconnect according to claim 59, in which said carbon comprises carbon black, carbon fiber or aqueous dispersed graphite.

61. The electrical interconnect according to claim 53, in which said material comprises a film-forming organic composition.

62. The electrical interconnect according to claim 53, in which said film forming organic composition comprises a surfactant.

63. The electrical interconnect according to claim 53, including also a metal member attached to said insulative film layer.

64. A method of reducing electrostatic discharge potential in a disk drive suspension comprising one or more portions tending to build up an electrostatic potential, said one or more portions supporting a signal conductor, the method including exposing at least one surface of a said portion, treating said exposed portion surface with a resistivity modifying agent comprising an electrostatic charge dissipative composition in an amount effective for continually leaking charge to ground at a rate greater than the rate of accumulation of electrostatic charge on said portion surface while avoiding shunting of said conductor and electrically coupling said composition to ground said resistivity modifying agent being in contact with said conductor.

65. The method according to claim 64, including also selecting as said composition a composition having a surface resistivity between about 100,000 ohms per square and 1000 megohms per square.

66. The method according to claim 65, including also selecting as said composition a composition comprising metal oxides, metals, carbon, or organic compositions.

67. A method of preventing electrostatic discharge in a suspension electrical interconnect comprising an insulative film with high resistivity and plural pairs of trace conductors, including disposing a material having a lower resistivity on or in said insulative film in an amount effective for continually leaking charge to ground at a rate greater than the rate of accumulation of electrostatic charge on said interconnect while avoiding shunting of said conductors, and electrically grounding said material said material being in contact with said conductors.

68. A method of reducing electrostatic discharge potential on a disk drive suspension comprising a base portion, a spring portion and a rigid portion adapted to carry a slider, one or more of said portions having a surface tending to build up an electrostatic discharge potential, said one or more portions supporting a signal conductor, the method including treating said surface with an electrostatic discharge dissipative material in an amount effective for continually leaking charge to ground at a rate greater than the rate of accumulation of electrostatic charge on said surface while avoiding shunting of said conductor, and electrically coupling said material to ground said dissipative material being in contact with said conductor.

69. The method according to claim 68, including also selecting as said electrostatic dissipative material a material having a surface resistivity between about 100,000 ohms per square and 1000 ohms per square.

70. The method according to claim 69, including also selecting as said material one or more of metals, metal oxides, carbon, and organic compositions.

71. A disk drive suspension assembly comprising a conductor and a spring element for biasing a slider into operating proximity with a disk, said assembly having a surface tending to develop an electrostatic discharge potential, and a surface resistivity modifying agent at said assembly surface, said agent being present at said assembly surface in an electrostatic discharge potential lowering effective amount, said modifying agent comprising a metal oxide said agent being coupled to ground.

72. The disk drive suspension assembly according to claim 71, in which said metal oxide is coated on said assembly surface.

73. The disk drive suspension assembly according to claim 71, in which said metal oxide is incorporated into said assembly surface.

74. The disk drive suspension assembly according to claim 71, in which said metal oxide comprises chromium oxide, tin oxide, nickel oxide, lead oxide or copper oxide.

75. A disk drive suspension comprising a conductor and a flexure for supporting on said suspension a slider in operating proximity to a disk, said suspension having a surface tending to develop an electrostatic discharge potential, and a surface resistivity modifying agent at said suspension surface in electrostatic discharge potential lowering amount, said surface resistivity modifying agent comprises an electrostatic potential dissipative metal oxide composition distributed in or on said suspension surface in an amount providing said surface with a surface resistivity between about 100,000 ohms per square and 1000 megohms per square.

76. The disk drive suspension according to claim 75, in which said metal oxide comprises chromium oxide, tin oxide, nickel oxide, lead oxide or copper oxide.

77. A suspension electrical interconnect comprising plural pairs of conductive traces and an insulative film layer supporting the traces, said film layer having a resistivity tending to build an electrostatic potential on said film layer, and an electrostatic discharge dissipative metal oxide material disposed on or in said insulative film layer, said material having a lower resistivity than said film layer but higher than will allow shunting of said conductive traces, said material being adapted to be electrically coupled to ground.

78. A suspension electrical interconnect, said interconnect comprising a plural pairs of conductive traces, an insulative film layer supporting the traces and supportable by a metal member, said film layer having a resistivity tending to build an electrostatic potential on said film layer, and an electrostatic discharge preventative metal oxide material disposed on or in said insulative film layer, said material having a lower resistivity than said film layer but higher than will allow shunting of said conductive traces, said material being adapted to be electrically coupled to ground.

79. The disk drive suspension according to claim 78, in which said metal oxide comprises chromium oxide, tin oxide, nickel oxide, lead oxide or copper oxide.

\* \* \* \* \*